(12) United States Patent
Sahin et al.

(10) Patent No.: US 9,378,288 B1
(45) Date of Patent: *Jun. 28, 2016

(54) REFINING SEARCH RESULTS

(71) Applicant: Google Inc., Mountain View, CA (US)

(72) Inventors: Engin Cinar Sahin, New York, NY (US); Daniel A. Rocha, New York, NY (US); Richard C. Wang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/682,190

(22) Filed: Apr. 9, 2015

Related U.S. Application Data

(63) Continuation of application No. 13/206,942, filed on Aug. 10, 2011, now Pat. No. 9,015,143.

(51) Int. Cl.
*G06F 17/30* (2006.01)

(52) U.S. Cl.
CPC ................ *G06F 17/30867* (2013.01)

(58) Field of Classification Search
USPC .......... 707/706, 713, 715, 741, 765
See application file for complete search history.

(56) References Cited

U.S. PATENT DOCUMENTS

| | | | |
|---|---|---|---|
| 6,240,409 B1 | 5/2001 | Aiken | |
| 6,460,029 B1 | 10/2002 | Fries | |
| 6,463,426 B1 | 10/2002 | Lipson | |
| 6,484,162 B1 | 11/2002 | Edlund | |
| 6,701,309 B1 | 3/2004 | Beeferman | |
| 6,760,724 B1 | 7/2004 | Chakrabarti | |
| 7,296,011 B2 | 11/2007 | Chaudhuri | |
| 7,571,162 B2 | 8/2009 | Sun | |
| 7,849,096 B2 * | 12/2010 | Fein | G06F 17/30395 707/759 |
| 8,032,519 B2 | 10/2011 | Groeneveld | |
| 8,145,630 B1 | 3/2012 | Garg | |
| 8,195,654 B1 * | 6/2012 | Riley | G06F 17/30864 706/12 |
| 8,332,393 B2 * | 12/2012 | Elyada | G06F 17/30864 707/722 |
| 8,452,762 B2 * | 5/2013 | Chi | G06F 17/30693 707/723 |
| 8,542,205 B1 * | 9/2013 | Keller | G06F 3/0488 345/173 |
| 8,595,619 B1 | 11/2013 | Cierniak | |
| 8,655,866 B1 | 2/2014 | Provine | |
| 8,655,886 B1 | 2/2014 | Gross | |

(Continued)

OTHER PUBLICATIONS

Narrative Information Disclosure Statement (1 page) and screen shots showing highlighting a phrase from a first web page, "right clicking" to display a dialog box, and selecting a search option, which returns a second web page of search results for the highlighted phrase (2 pages). Jun. 27, 2008.

(Continued)

*Primary Examiner* — Hanh Thai
(74) *Attorney, Agent, or Firm* — Fish & Richardson P.C.

(57) ABSTRACT

Methods, systems, and apparatus, including computer programs encoded on a computer storage medium, for refining search results. In one aspect, a method includes presenting search results that are responsive to a search query on a search engine results page and each search result includes a snippet. The method also include receiving a refinement to the search query through the search engine results page and generating a request to update one or more of the snippets based on the refinement. The method also includes receiving one or more updated snippets in response to the request and updating one or more of the search results presented on the search engine results page using the one or more updated snippets.

20 Claims, 4 Drawing Sheets

(56) References Cited

U.S. PATENT DOCUMENTS

| | | |
|---|---|---|
| 8,849,810 B2 | 9/2014 | Lucovsky |
| 2002/0019763 A1 | 2/2002 | Linden |
| 2003/0110163 A1 | 6/2003 | Chen |
| 2004/0254920 A1 | 12/2004 | Brill |
| 2006/0026147 A1* | 2/2006 | Cone ................. G06F 17/30867 |
| 2006/0059159 A1* | 3/2006 | Truong ............. G06F 17/30861 |
| 2006/0104484 A1 | 5/2006 | Bolle |
| 2007/0266022 A1 | 11/2007 | Frumkin |
| 2007/0299826 A1 | 12/2007 | Wang |
| 2008/0091670 A1* | 4/2008 | Ismalon ............. G06F 17/3064 |
| 2008/0133482 A1 | 6/2008 | Anick |
| 2008/0235209 A1 | 9/2008 | Rathod |
| 2008/0288474 A1 | 11/2008 | Chin |
| 2009/0119261 A1* | 5/2009 | Ismalon ............. G06F 17/3064 |
| 2009/0171813 A1* | 7/2009 | Byrne ............... G06F 17/30867 705/26.1 |
| 2010/0306249 A1* | 12/2010 | Hill .................. G06F 17/30867 707/769 |
| 2011/0035403 A1 | 2/2011 | Ismalon |
| 2011/0191338 A1 | 8/2011 | Hylton |
| 2011/0230176 A1 | 9/2011 | Kumar |
| 2011/0231383 A1 | 9/2011 | Smyth |
| 2012/0078936 A1* | 3/2012 | Kuo ................. G06F 17/30867 707/766 |

OTHER PUBLICATIONS

Silla, Jr., Carlos, N., et al., "An Analysis of Sentence Boundary Detection Systems for English and Portuguese Documents," Proceedings of 5th International Conference CICLing 2004, Seoul, Korea, Feb. 15-21, 2004, pp. 135-141.

Schneider, G., "A low-complexity, broad-coverage probabilistic Dependency Parser for English," Proceeding of HLT-NAACL 2003, Student Research Workshop, pp. 31-36, Edmonton, Canada, May-Jun. 2003.

Chien et al., Semantic Similarity Between Search Engine Queries Using Temporal Correlation, May 10-14, 2005, ACM, www 2005; proceedings of the 14th international conference on world wide web, pp. 2-11.

Li et al, A Survey on Wavelet Applications in Data Mining, Dec. 2002, ACM SIGKDD Explorations NewsLetter, vol. 4, Issue 2, pp. 49-68.

Das et al., Google News Personalization: Scalable Online Collaborative Filtering, May 8-12, 2007, ACM—www 07—Proceedings of the 16th international conference on world wide web, pp. 271-280.

Chakrabarti et al., Approximate query processing using wavelets, Sep. 2001, Springer-Veriag New York, vol. 10, Issues 2-2, pp. 199-223.

\* cited by examiner

REFINING SEARCH RESULTS

CROSS REFERENCE TO RELATED APPLICATION

This application is a continuation of U.S. application Ser. No. 13/206,942, filed Aug. 10, 2011, the contents of which is incorporated by reference.

BACKGROUND

This specification relates to refining search results.

The Internet provides access to a wide variety of online resources, including video or audio files, web pages for particular topics, maps, and news articles. A search system can identify resources in response to a search query that includes one or more search terms or phrases. The search system ranks the resources based on their relevance to the query and on measures of quality of the resources, and provides search results that include links to the identified resources. The search results are typically ordered for viewing according to their respective rank. The search results can also include a portion, i.e., a snippet, of the resource that the search system identifies as being particularly relevant to the query.

SUMMARY

This specification describes techniques for refining search results, including refining search results and updating the snippets.

In general, one aspect of the subject matter described in this specification may be embodied in methods that include the actions of receiving a refinement search query, and automatically updating one or more snippets that are displayed on a search engine results page to include a portion of a corresponding resource that matches the refinement search query, or to include an indication that a corresponding resource does not include any portion that matches the refinement search query. In doing so, the automatic updating of snippets implements a 'search for text' functionality within the content of resources that are identified—by search results, without requiring a new search query to be executed, and without requiring search results to be re-ranked or otherwise reorganized for presentation on the search engine results page.

In general, another aspect of the subject matter described in this specification may be embodied in methods that include the actions of presenting search results that are responsive to a search query on a search engine results page. Each search result includes a snippet. The methods can also include the actions of receiving a refinement to the search query through the search engine results page and generating a request to update one or more of the snippets based on the refinement. The methods can also include the actions of receiving one or more updated snippets in response to the request and updating one or more of the search results presented on the search engine results page using the one or more updated snippets.

Other embodiments of this aspect include corresponding systems, apparatus, and computer programs, configured to perform the actions of the methods, encoded on computer storage devices.

These and other embodiments can each optionally include one or more of the following features. The methods can include receiving an instruction to enter a refinement mode before generating the request to update the one or more of the snippets, wherein the instruction is received as a result of a user command. The methods can also include replacing a particular search result presented on the search engine results page with a search result not included in the presented search results using the one or more updated snippets. The methods can also include updating the one or more of the search results presented on the search engine results page by hiding a snippet included with a particular search result using on the one or more updated snippets.

Particular embodiments of the subject matter described in this specification can be implemented so as to realize one or more of the following advantages. In response to a refinement search query provided by a user, a snippet generator can quickly refine the results of a search query to update the snippets associated with the search results. The updated snippets include portions of the resource that match the refinement search query. In addition, search results that are not responsive to the refinement search query can be removed or hidden, which allows a user to quickly review the results of the refinement search query. In addition, the relative ranking of the search results can be maintained, which allows the user to quickly determine which search result is most likely to include relevant information.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
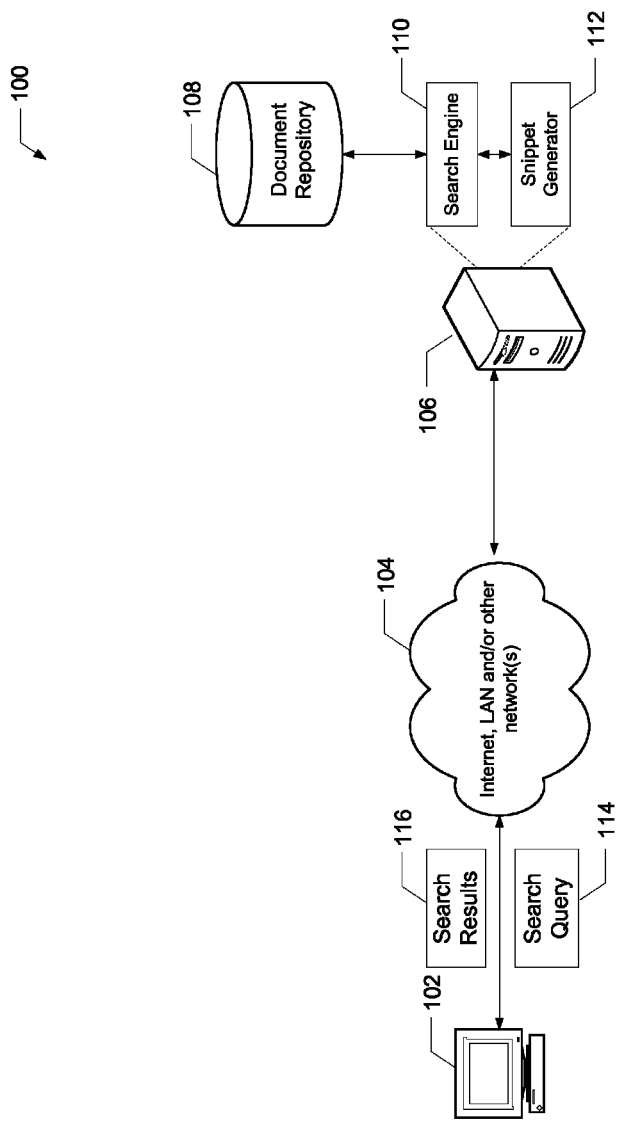
FIG. 1A is a block diagram of an example system in which search results are refined.
Figure 1B:
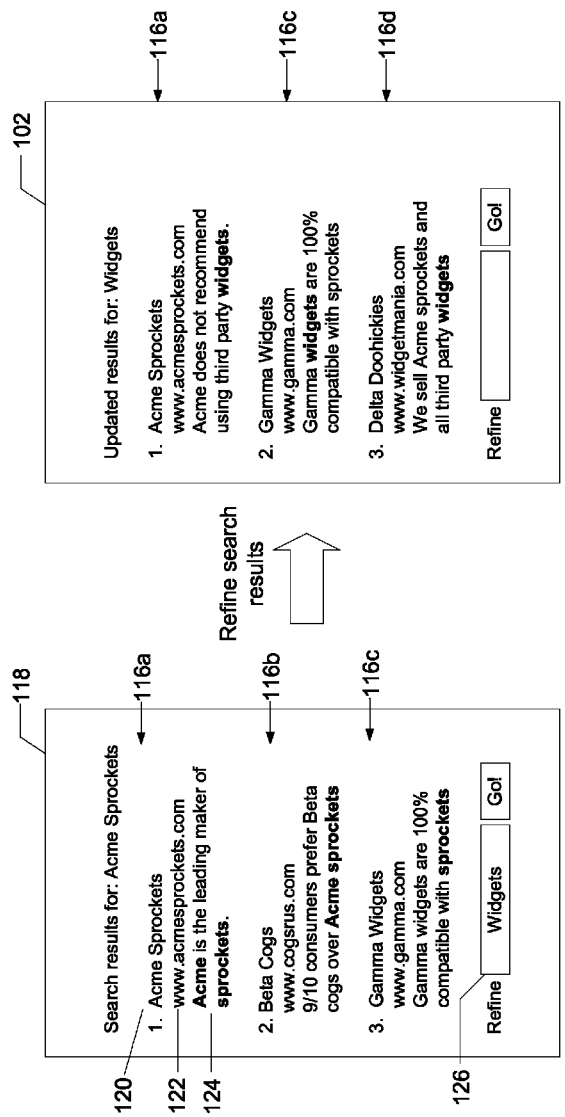
FIG. 1B is an illustration of example search engine results pages.

FIG. 1A is a block diagram of an example system 100 in which search results are refined. FIG. 1B is an illustration of example search engine results pages. FIG. 1A and FIG. 1B are discussed together. The example environment 100 includes a user device 102, a network 104 and a search system 106.

In general, the search system 106 receives search queries from the user device 102. The search system 106 generates search results, each of which can include links to various online resources, e.g., web pages, blogs, video or audio files, maps, product information, user information and news articles. After the search results are received at the user device 102, the search system 106 can search the contents of the resources associated with the search results to determine whether each resource/search result is responsive to a refinement search query.

For example, the refinement search query can be a query seeking particular search results or a subset of search results that include a particular word or phrase. In response to the refinement search query, the search system 106 can update the snippet accompanying one or more of the search results to include a portion of the resource that is responsive to the refinement search query. If a search result is not responsive to the refinement search query, the user device can hide or omit the search result. In addition, the user device can display an indication to indicate that the search result is not responsive to the refinement search query. In addition, the ranking of the search results can remain unchanged after the refinement search query is processed.

A search query includes one or more query terms that a user enters in a search engine user interface input field. Among other things, a result (or a search result) provided by a search engine in response to the search query includes a Uniform Resource Identifier (URI) that references a resource that the search engine determines to be responsive to the search query. The search result may include other things, e.g., a title, preview image, user rating, map or directions, description of the corresponding resource, or a snippet of text that has been automatically or manually extracted from, or otherwise associated with, the corresponding resource.

The user device 102 can be any type of device that can access the search engine through the network 104. For example, the user device 102 can be a personal computer, a laptop, a tablet computer or a smart phone. The user device 102 can include a web browser or other application that allows the user of the user device 102 to enter a search query 114 and that can display search results 116 received in response to the search query 114.

For example, the user device 102 can transmit search queries 114 to the search system 106 and receive a search engine results page 118 that includes the search results 116 from the search system 106. The user device 102 can display the search engine results page 118. The search engine results page 118 can be displayed in the web browser, e.g., a web page displayed on the web browser or other application. The search engine results page 118 is further described below.

The network 104 can be any type of network, e.g., a local area network (LAN), wide area network (WAN), the Internet, or a combination hereof. The network 104 facilitates connectivity between the user device 102 and the search system 106.

The search system 106 can be one or more servers configured to receive search queries 114 from the user device 102. The search system 106 can include a document repository 108, a search engine 110 and a snippet generator 112.

The document repository 108 can be any type of database or memory system. The document repository 108 can include copies of online resources or indexes storing data about the online resources. The search engine 110 and the snippet generator 112 can access document repository 108. The search engine 108 can receive a search query 114 and identify resources that are responsive to the search query 114.

Relevance scores can be used to rank the search results in order of relevance with respect to the search query 112. For example, a resource with a high relevance score is more relevant to the search query 114 than a resource with a low relevance score. In some implementations, the relevance score for each of the search results 116 can be based on and/or include score components for the title/name of the resource, a category associated with the resource and/or quality of the resources.

The search engine 108 can also interact with the snippet generator 108 to identify portions, i.e., snippets, of each resource that are responsive to the search query 114 and provide these portions to the search engine 108. For example, the search engine 108 can provide the snippet generator 112 with a resource identifier, e.g., a URI, or other token that identifies the resource associated with a search result.

The snippet generator 108 can access the document repository 108 and analyze the content of the resource, e.g., text, meta-data, links, etc., to determine which portions of the resource are responsive to the search query 114. In some implementations, the snippet generator 108 analyzes the text and/or meta-data included in each resource and identifies portions of the text that include the some or all of the query terms. In some implementations, the snippet generator 112 can use various rules (e.g., grammar rules or context-based rules) to identify the portions of the resource that are responsive to the search query.

The snippets can be any portion of a resource that is responsive to the search query 114. For example, a snippet can be a word, a phrase, a sentence, a sentence fragment, a title of an audio or video file, a link or URL, and/or title of resource. The snippet generator 112 can associate the snippet to the search result using the resource identifier, e.g., the URI, or other token to identify the search result. The search system 106 can include the snippets with the search results 114 in a search engine results page 118 or the snippet generator 112 can provide the snippets to the user device 102.

The search system 106 can provide a search engine results page 118 that includes the search results 116 to the user device 102. The user device 102 can display the search engine results page 118 using a web browser or other application. The search engine results page 118 can include a search engine user interface field 119 to receive a search query.

The search engine results page 118 can display all or a portion of the search results 116. For example, in some implementations, the search engine results page 118 can display the ten highest ranked search results. As seen in FIG. 1, for each search result 116a-c, the search engine results page 118 can display the title of the resource 120, the URL corresponding to resource 122 and the snippet associated with the search result 124. In some implementations, the search engine results page 118 can use the URI or other identifier to display the snippet 124 with the corresponding search result. In some implementations, the search system can provide search results 116 that are not included in the search engine results page 118 or are not visible on the search results page 118.

In some implementations, the search engine results page 118 can include a refinement search control 126 to refine the search results 116. In some implementations, the refinement search control 126 is displayed on the search engine results page 118 along with the displayed search results 116. In some implementations, the refinement search control 126 is displayed as part of a tool bar or as part of an extension to the web browser.

In some implementations, the refinement search control 126 appears after a user enters a command or activates a refinement mode. For example, the user can enter a combination of keys, e.g., CTRL-F1, a function key, e.g., F1, or a gesture, e.g., a mouse gesture or a gesture performed on a track-pad, to activate the refinement search control 126 and cause the search engine results page 118 display the refinement search control 126.

In some implementations, the refinement search control 126 can be implemented as part of the search engine user interface input field 119. In these implementations, the search engine user interface input field 119 acts as the refinement search control 126 when an operator is entered in the search engine user interface input field. For example, a user can enter the operator "refine:" or "!!" and followed by the refinement search query to have the search engine user interface input field 119 act as the refinement search control 126.

The refinement search control 126 can receive a refinement search query and signal, instruct, or otherwise cause the search engine results page 118 to update the search results 116 with or without instructing the search engine 110 to perform a subsequent search query. For example, the refinement search control 126 can receive the refinement search query and provide a snippet update request to the snippet generator 112 to update the search results that have previously been identified by the search engine 110.

The snippet update request can include various types of data. For example, in some implementations, the refinement search query can include the search query, the refinement search query, a snippet type request, e.g., a request for a snippet that includes a particular data type, e.g., text, multimedia, etc., and the resource identifiers associated with all of the search results or a portion of the search results, e.g., the displayed search results, to the snippet generator 112. The snippet generator 112 can analyze the contents of the resources associated with the search results and identify snippets that match the refinement search query.

The snippet generator 112 provides the updated snippets and the corresponding resource identifiers to the user device 102, which updates the snippets 124 associated with each search result. The user device 102 can update the snippets 124 using various techniques and/or tools, e.g., software implemented in Java or AJAX. The search engine results page 118 updates the displayed search results without invoking a second search performed by the search engine 110.

In some implementations, the snippet generator 112 can analyze the contents of the resources associated with the search results and identify snippets that match the refinement search query and the search query. For example, the snippet generator 112 can identify portions of the resources that include query terms from both the refinement search query and the search query. As an example, the snippet generator 112 can identify a sentence that includes query terms from both the refinement search query and the search query as a responsive portion. As another example, the snippet generator 112 can identify phrases or sentence as responsive to the refinement search query if the phrases or sentences are near one another and include the query terms.

In some implementations, if a particular resource/search result does not include content that matches the refinement search query, the snippet generator 112 can provide a symbol or token to indicate that the search result is not responsive to the refinement search query. In some implementations, if a particular resource/search result is not responsive to the refinement search query, the search engine results page 118 can omit or hide the particular search result, allowing lower ranked search results to move up to take its place within the search engine results page 118.

In some implementations, if a particular search result is not responsive to the refinement search query, the search engine results page 118 can display a symbol or token, e.g., a red "X" or a horizontal line in place of a snippet or omit the snippet to indicate that the search result is not responsive to the refinement search. In some implementations, the search engine results page 118 can hide the snippet if a particular search result is not responsive to the refinement search query.

As shown in FIG. 1B, after receiving search results 116 that are responsive to the search query "Acme Sprockets," the search engine results page 118 displays the three search results 116a-c with highest relevancy scores, which are displayed in order of responsiveness to the search query 114, i.e., search result 116a has the highest relevancy score. For each search result 116a-c, the search engine results page 118 can display a title 120, an URL 122 and a snippet 124.

The snippet 124 may be, for example, a portion of text from the resource linked-to by the URL 122 that the snippet generator 112 deems to be most relevant to the search query "Acme Sprockets," e.g., the first portion of text from the resource that exactly matches the search query. The search engine results page 118 can include additional search results that are not displayed because of the window or screen size and/or relevancy scores.

A refinement search query "Widgets" is received at the refinement search control 126, which provides a snippet update request to the snippet generator 112. In some implementations, the snippet update request includes the refinement search query and the resource identifiers associated with the search results. In the FIG. 1 example, the snippet update request does not instruct the search engine 110 to perform a second search. Instead, the snippet generator 112 can identify new snippets associated with the previously identified search results 116 and provides the new snippets to the search engine results page 128, which updates the displayed search results.

As seen in FIG. 1B, the search engine results page 128 omits search result 116b and includes search result 116d. Search result 116b is not displayed because the resource associated with search result 116b did not include the term "Widgets." Search result 116d can be the search result with the next highest relevancy score and is responsive to the refinement search query. The search result 116d can be provided with the search results but not displayed because of its relevancy score or because of the size of the screen or window. The search engine results page 128 maintains the ordering of the search results 116a, 116c and 116d.

Figure 2:
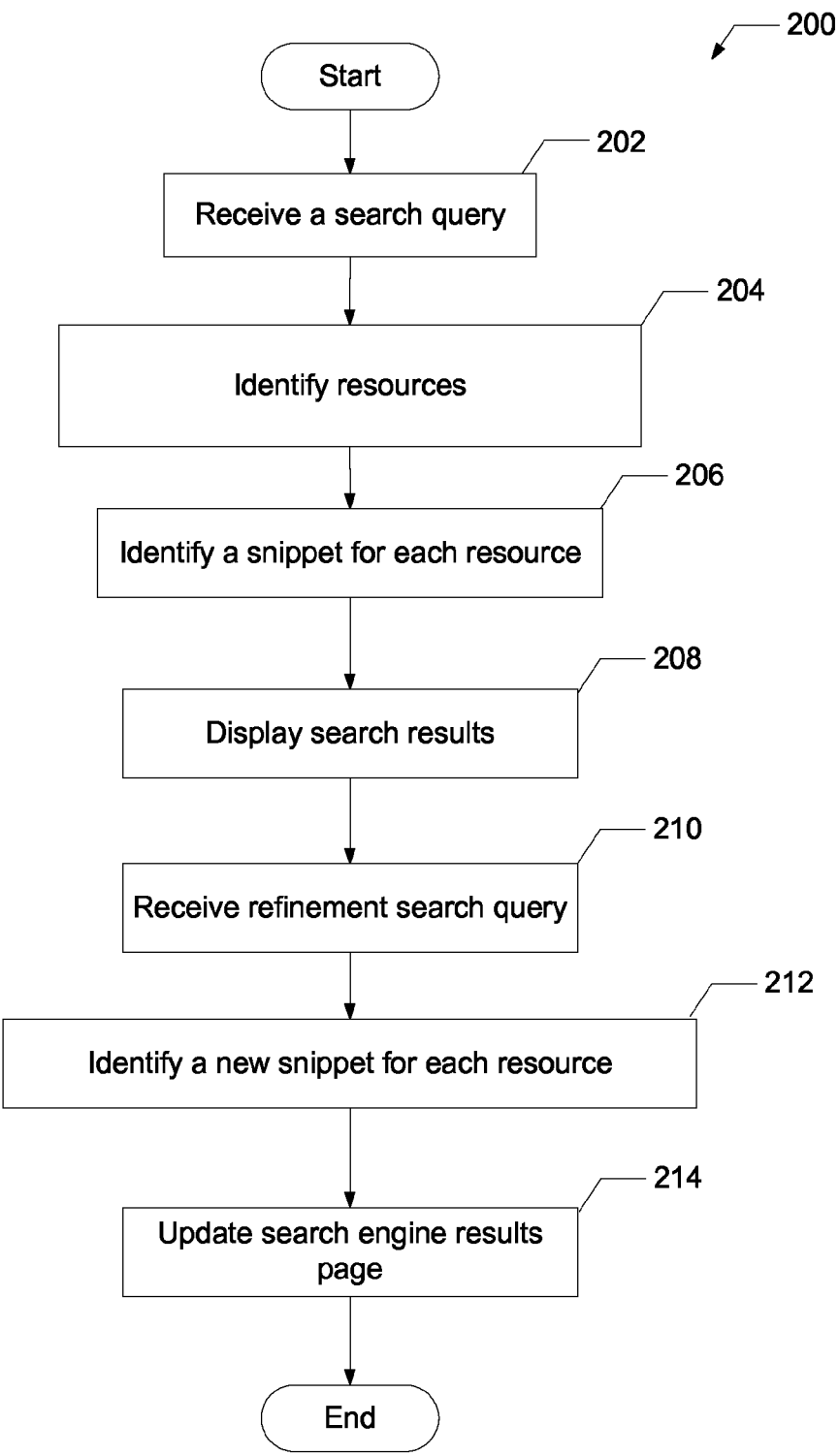
FIG. 2 is a flowchart of an example process for refining search results.

FIG. 2 is a flowchart of an example process 200 for refining search results. The process 200 begins by receiving a search query (step 202). For example, the search system 106 can receive a search query 114 from the user device 102. The search system 106 can then identify resources that are responsive to the search query and rank the resources (step 204).

A snippet is identified for each of the search results (step 206). For example, for each search result, the snippet generator 112 analyzes the content of the resource associated with a search result and identify portion(s) of the resource that is responsive to the search query 116 to be used as the snippet. In some implementations, the snippet generator 112 identifies words or sentences in a resource that includes terms from the search query 116 as the snippet. After the snippet is identified, the snippet generator 112 associates the snippet with the search result 116. For example, the snippet generator 112 can associate the snippet with the search result 116 using the URI so the snippet is displayed with the search result 116.

The search system provides the search results to the user device (step 208). For example, the search system 106 can provide the search results 116 to the user device 102 in a search engine results page 118. In some implementations, the search engine results page 118 displays the search results in a rank order. In some implementations, the search engine results page 118 displays the ten most relevant search results. The search engine results page 118 displays the search result 116 and the associated snippets 124.

After the search results are displayed, a refinement search query can be received (step 210). For example, a user of the user device 102 can provide a refinement search query to the refinement search control 126, which provides the snippet update request to the snippet generator 112. The snippet update request can include various types of data. For example, in some implementations, the snippet update request can include the search query, the refinement search query, a snippet type request, and the resource identifiers associated with all of the search results or a portion of the search results, e.g., the displayed search results. The snippet update request may or may not include a request for the search engine to generate new search results.

For each search result, a new snippet is identified and associated with the search result (step 212). For example, in response to a request from the client device, the snippet generator 112 can analyze the content of each resource associated with a search result and identify portions of the resource that are responsive to the refinement search query. In some implementations, the snippet generator 112 identifies portions of the resource that include one or more terms from the refinement search query terms.

The search engine results page is then updated to display the new snippets (step 214). For example, the snippet generator 112 can transmit the updated snippets to the user device 102, which updates the search engine results page 118 and the displayed search results 116. For example, the web browser on the user device 102 can update the search engine results page 118 and update the displayed search results to include the new snippets that are responsive to the refinement search query.

If a particular search result does not match the refinement search query, e.g., the snippet generator provided a token or descriptor to indicate that no snippet was identified for the search result, the search engine results page 118 can replace the snippet with a symbol or hide the snippet to indicate that the particular search result is not responsive to the refinement search query. In some implementations, the search engine results page 118 can hide the particular search result and display the next search result that is responsive to the search query.

For example, the updated search engine results page 128 of FIG. 1B illustrates that search result 116b was not responsive to the refinement search query and a new search result 116d is displayed. In some implementations, the search result 116d can be provided to the user device 102 with the search results but is not displayed because of its relevancy score or for some other reason. Although not shown in FIG. 2, additional refinement search queries can be transmitted and the search results can be further refined.

Figure 3:
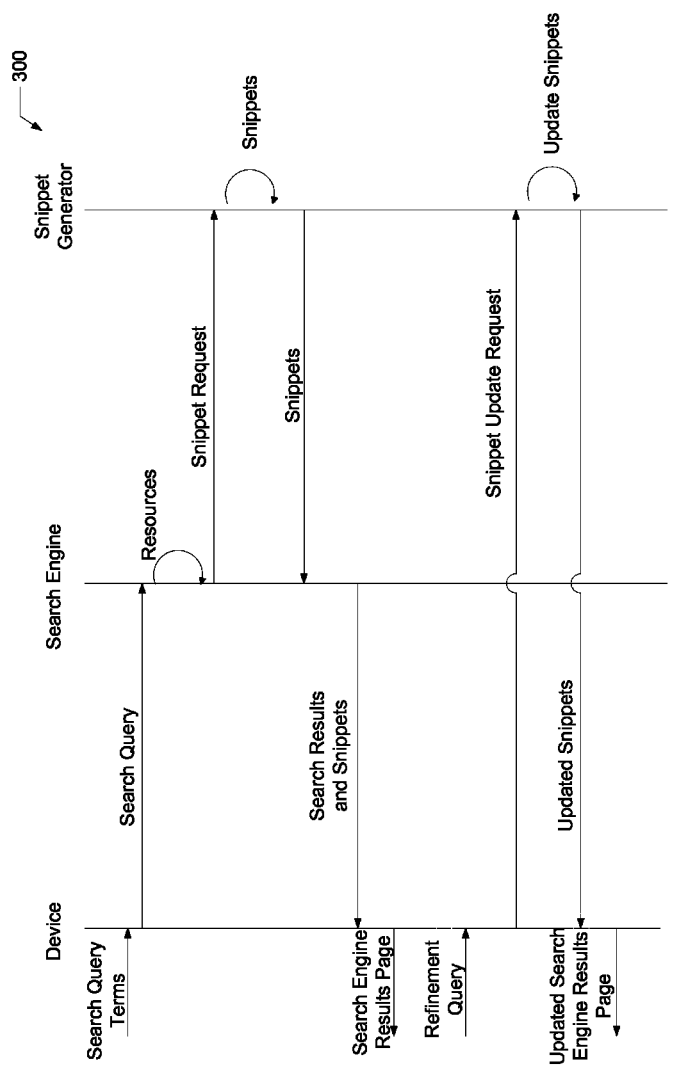
FIG. 3 is an illustration of an example exchange of data between a user device, a search engine and a snippet generator.

FIG. 3 is an illustration of an example exchange of data 300 between the user device, the search engine and the snippet generator. In some implementations, as described below, the snippet generator can be executed on the user device 102 and interact with the search engine results page to provide snippets and/or update snippets. In these cases, the snippet update request is an operation internal to the user device 102.

The user device 102 receives search query terms 114 from a user. The user device 102 then transmits the search query 114 to the search engine 110. The search engine 110 identifies resources that match the search query. The search engine 110 also ranks the search results.

The search engine 110 then requests that the snippet generator 112 identify snippets for the search results that are displayed on the search engine results page 118 or for some predetermined number of search results, e.g., 15 or 20. The snippet generator 112 identifies the snippets for each search result and then provides the snippets to the search engine 110. The search results 114, including the search results and the snippets associated with each search result, are provided to the user device 102 from the search engine for display. The user device 102 then displays the search engine results page 118, which includes the search results 114.

After the search results 114 are displayed, a refinement search query is received at the user device 102. The refinement search query can be received at the refinement search control, which can be part of the search engine results page, a toolbar, or an extension associated with the web browser. The user device 102 then provides the snippet update request to the snippet generator 112, which identifies new snippets for the search results without performing a subsequent search, and without causing the search engine 110 to execute a subsequent search. If the snippet generator 112 is unable to identify a snippet that matches the refinement search query within a particular search result, the snippet generator 112 can provide a token or descriptor that indicates that the particular search result did not include a snippet that is responsive to the refinement search query, or the particular search result may be hidden from display to allow lower-ranked search results which satisfy the refinement search query to be displayed. The snippet generator 108 provides the updated snippets to the user device 102. The user device 102 provides the updated snippets to the search engine results page 118, which then updates the displayed list of search results.

In some implementations, the snippet generator 112 can be implemented on or executed on the user device 102 and interact with the search engine results page 118 to provide snippets and/or update snippets. For example, the search engine 110 can transmit the search results 114 along with the contents of the resources to the user device 102 and the snippet generator 112 can analyze the contents of the resources to identify the snippets. The snippet generator 112 can provide the snippets to the search engine results page 116. Generating the snippets and/or updated snippets would be an operation performed on the user device 102.

As another example, in some implementations, the ranking of the elements can change based on the refinement search query. For example, after the refinement search query is provided to the search system 106, the search results can be re-ranked in accordance to how responsive each resource is to the initial search query 114 and the refinement search query. The ranking can be biased such that the search results responsiveness to the initial search query is more heavily weighted than the search results responsiveness to the refinement search query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, a non-transitory computer-storage medium, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining a set of search results that a search engine identifies as responsive to a search query;
   providing, for display, first multiple search results from among the set of search results;
   receiving data indicating a refinement to the search query;
   in response to receiving the data indicating the refinement to the search query, obtaining a subset of the set of search results that satisfy the refinement without instructing the search engine to perform a subsequent search;
   for each respective search result of second multiple search results selected from among the subset of the set of search results, obtaining a respective portion from a respective resource referenced by the respective search result, wherein the respective portion is responsive to the refinement; and
   providing, for display, the second multiple search results and the respective portion from the respective resource referenced by each of the second multiple search results.

2. The method of claim 1, wherein obtaining the respective portion from the respective resource referenced by the respective search result comprises obtaining a respective snippet generated from the respective resource.

3. The method of claim 1, wherein providing the first multiple search results comprises:
   for each respective search result of the first multiple search results:
      obtaining a first respective portion from a respective resource referenced by a respective search result of the first multiple search results; and
      providing the first multiple search results and the first respective portion referenced by each of the first multiple search results.

4. The method of claim 1, wherein the refinement to the search query is received from a search engine results page, a toolbar, or an extension associated with a web browser.

5. The method of claim 1, wherein the first multiple search results and the second multiple search results both include a particular search result, and wherein a ranking of the particular search result in the first multiple search results is different from a ranking of the particular search result in the second multiple search results.

6. The method of claim 1, wherein the first multiple search results and the second multiple search results both include a particular search result, and wherein a ranking of the particular search result in the set of search results that the search engine identifies as responsive to the search query remains constant in the first multiple search results and in the second multiple search results.

7. The method of claim 1, further comprising receiving a command for activating a refinement mode before receiving the data indicating the refinement to the search query.

8. A system, comprising:
memory; and
one or more processors coupled to the memory and configured to perform operations comprising:
obtaining a set of search results that a search engine identifies as responsive to a search query;
providing, for display, first multiple search results selected from among the set of search results;
receiving data indicating a refinement to the search query;
in response to receiving the data indicating the refinement to the search query, obtaining a subset of the set of search results that satisfy the refinement without instructing the search engine to perform a subsequent search;
for each respective search result of second multiple search results selected from among the subset of the set of search results, obtaining a respective portion from a respective resource referenced by the respective search result, wherein the respective portion is responsive to the refinement; and
providing, for display, the second multiple search results and the respective portion from the respective resource referenced by each of the second multiple search results.

9. The system of claim 8, wherein obtaining the respective portion from the respective resource referenced by the respective search result comprises obtaining a respective snippet generated from the respective resource.

10. The system of claim 8, wherein providing the first multiple search results comprises:
for each respective search result of the first multiple search results:
obtaining a first respective portion from a respective resource referenced by a respective search result of the first multiple search results; and
providing the first multiple search results and the first respective portion referenced by each of the first multiple search results.

11. The system of claim 8, wherein the refinement to the search query is received from a search engine results page, a toolbar, or an extension associated with a web browser.

12. The system of claim 8, wherein the first multiple search results and the second multiple search results both include a particular search result, and wherein a ranking of the particular search result in the first multiple search results is different from a ranking of the particular search result in the second multiple search results.

13. The system of claim 8, wherein the first multiple search results and the second multiple search results both include a particular search result, and wherein a ranking of the particular search result in the set of search results that the search engine identifies as responsive to the search query remains constant in the first multiple search results and in the second multiple search results.

14. The system of claim 8, wherein the operations further comprise receiving a command for activating a refinement mode before receiving the data indicating the refinement to the search query.

15. A non-transitory computer readable medium encoded with a computer program comprising instructions that, when executed, operate to cause a computer to perform operations:
obtaining a set of search results that a search engine identifies as responsive to a search query;
providing, for display, first multiple search results selected from among the set of search results;
receiving data indicating a refinement to the search query;
in response to receiving the data indicating the refinement to the search query, obtaining a subset of the set of search results that satisfy the refinement without instructing the search engine to perform a subsequent search;
for each respective search result of second multiple search results selected from among the subset of the set of search results, obtaining a respective portion from a respective resource referenced by the respective search result, wherein the respective portion is responsive to the refinement; and
providing, for display, the second multiple search results and the respective portion from the respective resource referenced by each of the second multiple search results.

16. The computer readable medium of claim 15, wherein obtaining the respective portion from the respective resource referenced by the respective search result comprises obtaining a respective snippet generated from the respective resource.

17. The computer readable medium of claim 15, wherein providing the first multiple search results comprises:
for each respective search result of the first multiple search results:
obtaining a first respective portion from a respective resource referenced by a respective search result of the first multiple search results; and
providing the first multiple search results and the first respective portion referenced by each of the first multiple search results.

18. The computer readable medium of claim 15, wherein the refinement to the search query is received from a search engine results page, a toolbar, or an extension associated with a web browser.

19. The computer readable medium of claim 15, wherein the first multiple search results and the second multiple search results both include a particular search result, and wherein a ranking of the particular search result in the first multiple search results is different from a ranking of the particular search result in the second multiple search results.

20. The computer readable medium of claim 15, wherein the first multiple search results and the second multiple search results both include a particular search result, and wherein a ranking of the particular search result in the set of search results that the search engine identifies as responsive to the search query remains constant in the first multiple search results and in the second multiple search results.

* * * * *